US006858951B2

(12) United States Patent
Liao

(10) Patent No.: US 6,858,951 B2
(45) Date of Patent: Feb. 22, 2005

(54) WIRE REWINDING BOX WITH RECHARGE UNIT

(76) Inventor: Sheng Hsin Liao, No. 10, Alley 38, Lane 229, San Chun St., Shulin, Taipei Hsien (TW)

( * ) Notice: Subject to any disclaimer, the term of this patent is extended or adjusted under 35 U.S.C. 154(b) by 112 days.

(21) Appl. No.: 09/972,892

(22) Filed: Oct. 10, 2001

(65) Prior Publication Data

US 2003/0067171 A1 Apr. 10, 2003

(51) Int. Cl.⁷ ............................................. H02K 7/116
(52) U.S. Cl. ..................................... 290/1 C; 290/1 E
(58) Field of Search ................................ 290/1 C, 1 E; 362/192

(56) References Cited

U.S. PATENT DOCUMENTS

| | | | | |
|---|---|---|---|---|
| 1,333,119 A | * | 3/1920 | Krag-Muller | 310/75 R |
| 2,424,700 A | * | 7/1947 | McMath | 362/192 |
| 3,370,220 A | * | 2/1968 | Douglass et al. | 322/40 |
| 4,315,301 A | * | 2/1982 | Jimena | 362/193 |
| 4,701,835 A | * | 10/1987 | Campagnuolo et al. | 362/192 |
| 5,363,445 A | * | 11/1994 | Shyu | 379/433.11 |
| 5,722,055 A | * | 2/1998 | Kobayashi et al. | 455/575.8 |
| 6,058,591 A | | 5/2000 | Prater | |
| 6,059,081 A | * | 5/2000 | Patterson et al. | 191/12.2 R |
| 6,199,674 B1 | | 3/2001 | Liao | |
| 6,254,025 B1 | | 7/2001 | Liao | |
| 6,257,382 B1 | | 7/2001 | Liao | |
| 6,291,900 B1 | * | 9/2001 | Tiemann et al. | 290/1 A |
| 6,315,231 B1 | | 11/2001 | Liaom | |
| 6,397,991 B1 | * | 6/2002 | Chang | 191/12.4 |

FOREIGN PATENT DOCUMENTS

| | | | | | |
|---|---|---|---|---|---|
| DE | 4310577 A1 | * | 2/1994 | | F21Q/3/00 |
| EP | 762047 A1 | * | 3/1997 | | F21L/13/08 |
| GB | 2088651 A | * | 6/1982 | | H02K/7/02 |
| TW | 86209323 | | 6/1986 | | |
| TW | 86209324 | | 12/1999 | | |
| TW | 88206807 | | 2/2000 | | |
| TW | 88203935 | | 12/2000 | | |
| TW | 88206805 | | 3/2001 | | |

* cited by examiner

Primary Examiner—Joseph Waks
(74) Attorney, Agent, or Firm—Rosenberg, Klein & Lee

(57) ABSTRACT

A wire rewinding box with a recharge unit, including a casing, a windlass, a coil spring, a communication wire, a recharge unit and a press handle. Inside the casing is the formation of an accommodating chamber. The windlass is installed in the accommodating chamber. The coil spring is installed between the casing and the windlass. The communication wire is wound on the windlass. The recharge unit is installed inside the casing, consisting of a gear mechanism, a generator and a battery. The press handle is installed at one side of the casing. The gear mechanism is installed between the windlass, the press handle and the generator.

7 Claims, 16 Drawing Sheets

WIRE REWINDING BOX WITH RECHARGE UNIT

BACKGROUND OF THE INVENTION (a) Field of the Invention

The invention relates to a wire rewinding box with a recharge unit particularly a wire rewinding box with a recharge unit that has been developed for application on various communication appliances for short-distance cable transmission, providing a length of communication wire that can be pulled out for use, and automatically rewound after the use, to avoid the wire from tangling up, and in the process of pulling the communication wire or pressing a press handle, is capable of generating or recharging power.

(b) Description of the Prior Art

Communication wires are required to connect various communication appliances, such as computer, modem, telephone or facsimile machine. To avoid too long or too many communication wires that may end up tangled up in knots, the inventor had developed a variety of wire rewinding boxes that are applicable to various communication appliances, and had filed applications for patents, such as Taiwan Patent Application numbers 86209323, 86209324, 88203935, 88206805, 88206807; and U.S. Pat. Nos. 6,199,674; 6,056,591; 6,257,382; 6,254,025; and 6,315,231. Of which, most of the wire rewinding boxes consist of a casing, a windlass, a coil spring and a communication wire, the coil spring being fixed to the windlass to provide resilient energy to rewind and reset the communication wire winding on the windlass.

When the communication wire is pulled out of a conventional rewinding box, it may become tense because it is subjected to the powerful pulling force of the coil spring, resulting in failure of maintaining a specified length outside the box. It could cause big trouble to the user. Therefore, the inventor has invented a variety of innovated wire rewinding boxes which are capable of pulling out the communication wire and fastening it in place, for which the inventor has filed applications, including Taiwan Application number 88206807; as well as U.S. Pat. NOS. 6,199,674 and 6,056,591, involving the use of a swing plate that swings flexibly, and dents on the rim of the windlass to enabling rewinding and positioning functions.

However, the conventional wire rewinding box has only the function of rewinding the communication wire, without the functions of recharging and supply power source. Therefore, the conventional models are restricted in their applications.

With the employment of unique considerations and application of theories, and based on several years experience in specialized production of all sorts of wire rewinding boxes, the inventor has come up with an innovated wire rewinding box with a recharge unit.

SUMMARY OF THE INVENTION

The primary objective of the invention is to provide a wire rewinding box with a recharge unit, which has the conventional function of a wire rewinding box to rewind a communication wire. In addition to that, the user can also pull on the communication wire to enable the recharge unit to generate power. Optionally, the user can press on a press handle to enable the recharge unit to generate power. Thereby, providing functions of power generating, power recharging and providing a power source, the rewinding box can be connected to a mobile phone set or such communication appliances for recharging purpose and providing power source.

The second objective of the invention is to provide a wire rewinding box with a recharge unit, which has the functions of power generating, recharging and power source, inside which is installed a circuit board. The circuit board is designed to have varied circuits to suit circumstances and serve multiple functions to extend the range of applications of the wire rewinding box, such as illumination, alarm set or radio receiver.

To achieve the above objectives, the invention provides a wire rewinding box with a recharge unit, including a casing, a windlass, a coil spring, a communication wire, a recharge unit and a press handle. Inside the casing is the formation of an accommodating chamber. The windlass is installed inside the accommodating chamber. The coil spring is installed between the casing and the windlass. The communication wire is wound on the windlass. One end of the communication wire is pulled out of the casing. The recharge unit is installed inside the casing, consisting of a gear mechanism and a power generator. The press handle is installed at one side of the casing. The gear mechanism is installed between the windlass, the press handle and the generator, thereby comprising a wire rewinding box with a recharge unit.

For better understanding of the technology, technical approach, and anticipated performance and objectives of the present invention, please refer to the detailed description and drawings as follows.

DETAILED DESCRIPTION OF PREFERRED EMBODIMENTS

Figure 1:
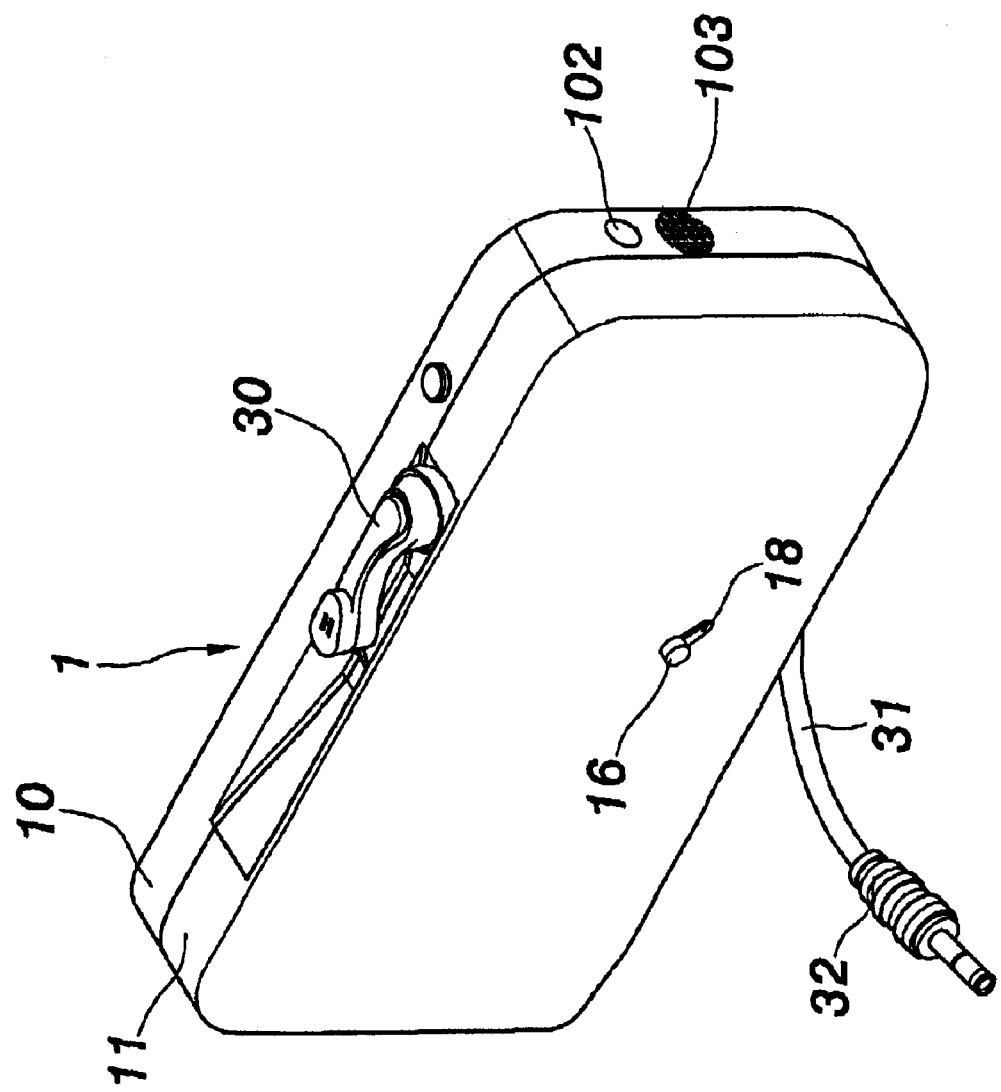
FIG. 1 is a perspective view of the invention.

As shown in FIGS. 1 through 5 that illustrate the preferred embodiments of the present invention of a wire rewinding box with a recharge unit, including a casing 1, a windlass 2, a communication wire 3, a recharge unit 4 and a press handle 8, wherein:

The casing 1 consists of a first half casing 10 and a second half casing 11 that are combined as one unit, containing an accommodating chamber 12 inside. The accommodating chamber 12 has a shaft 13. The shaft 13 has a wire channel 14. At one side of the casing 1 is a wire outlet 15. Also inside the accommodating chamber 12 is the windlass 2. The windlass 2 has a shaft hole 20 that is inserted by the shaft 13 to enable rotation. On two side of the windlass are respectively a first winding rim 21 and a second winding rim 22. The first winding rim 21 has a hook groove 23, onto which is engaged a hook end 60 of a coil spring 6 on an outside of the windlass 2, so the coil spring 6 is installed between the casing 1 and the windlass 2, providing resiliency for resetting the windlass 2 after it is rotated. The second winding rim 22 has an open groove 24.

One end of the communication wire 3 is pulled through the wire channel 14 on the shaft 13, winding several laps around the shaft 13. The communication wire 13 is then wound through the open groove 24 of the second winding rim 22 and around the second winding rim 22, then out of the wire outlet 15 on the casing 1, hooking the hook end 60 of the coil spring 6 onto the hook groove 23.

Figure 2:
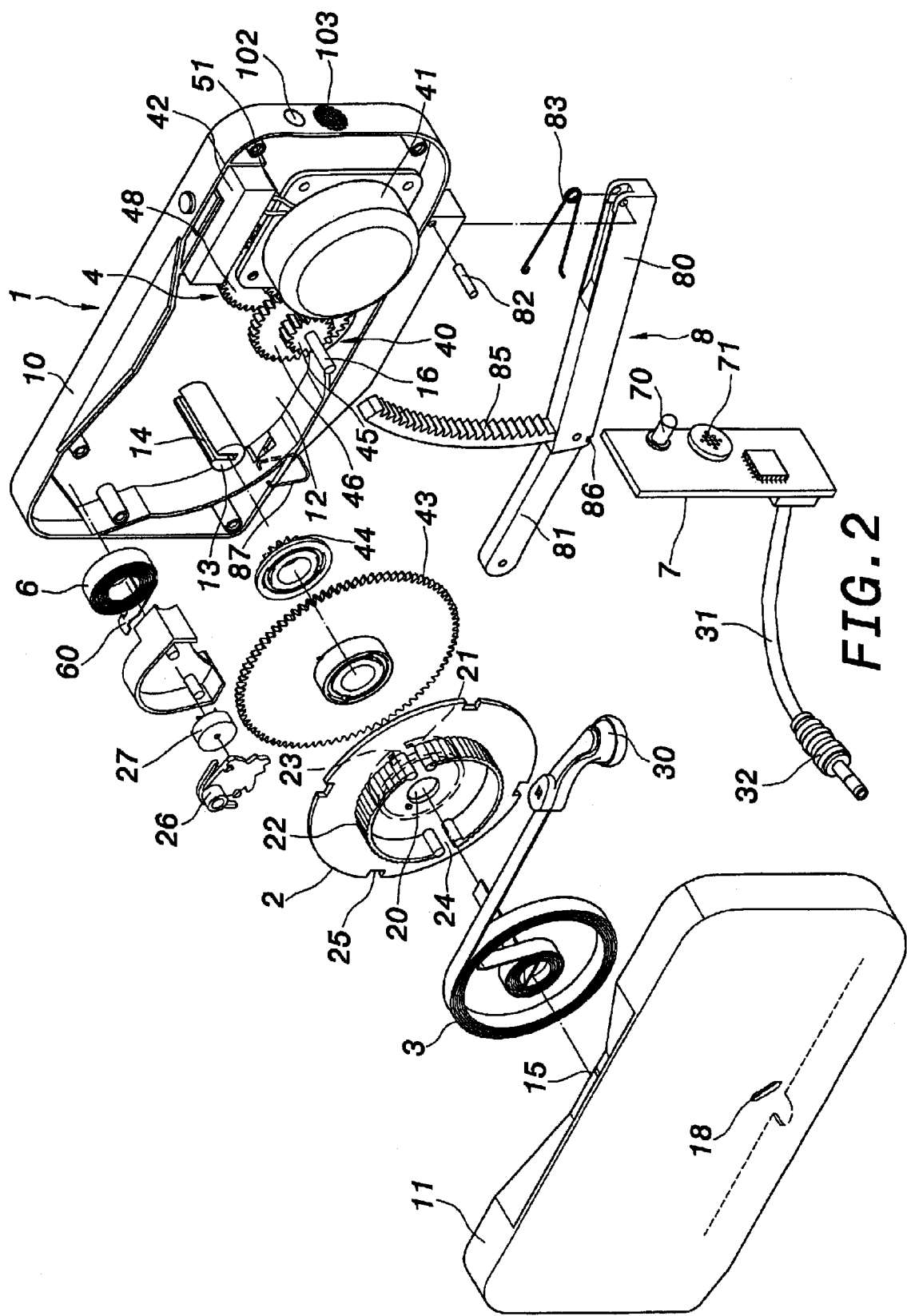
FIG. 2 is an exploded view of the invention.
Figure 3:
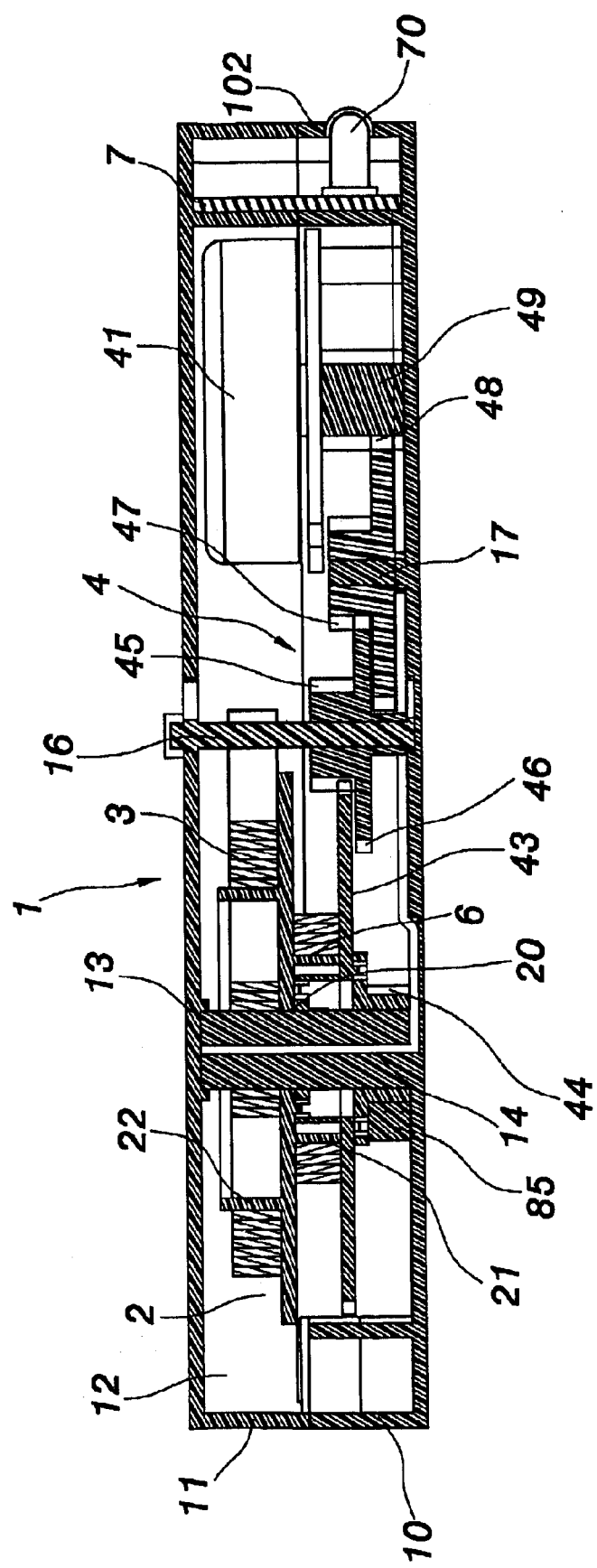
FIG. 3 is a section view of the invention (1).
Figure 4:
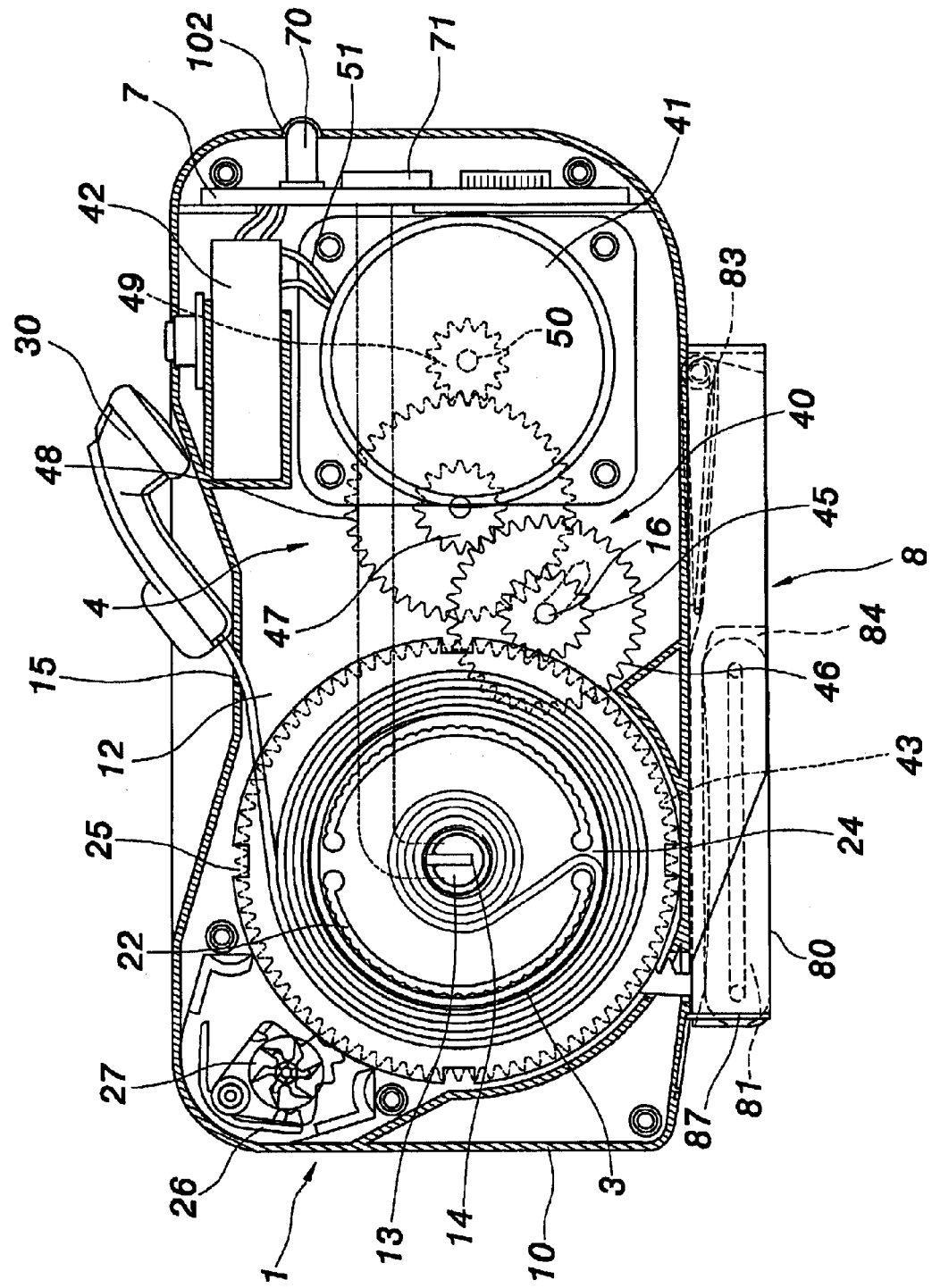
FIG. 4 is a section view of the invention (2).
Figure 5:
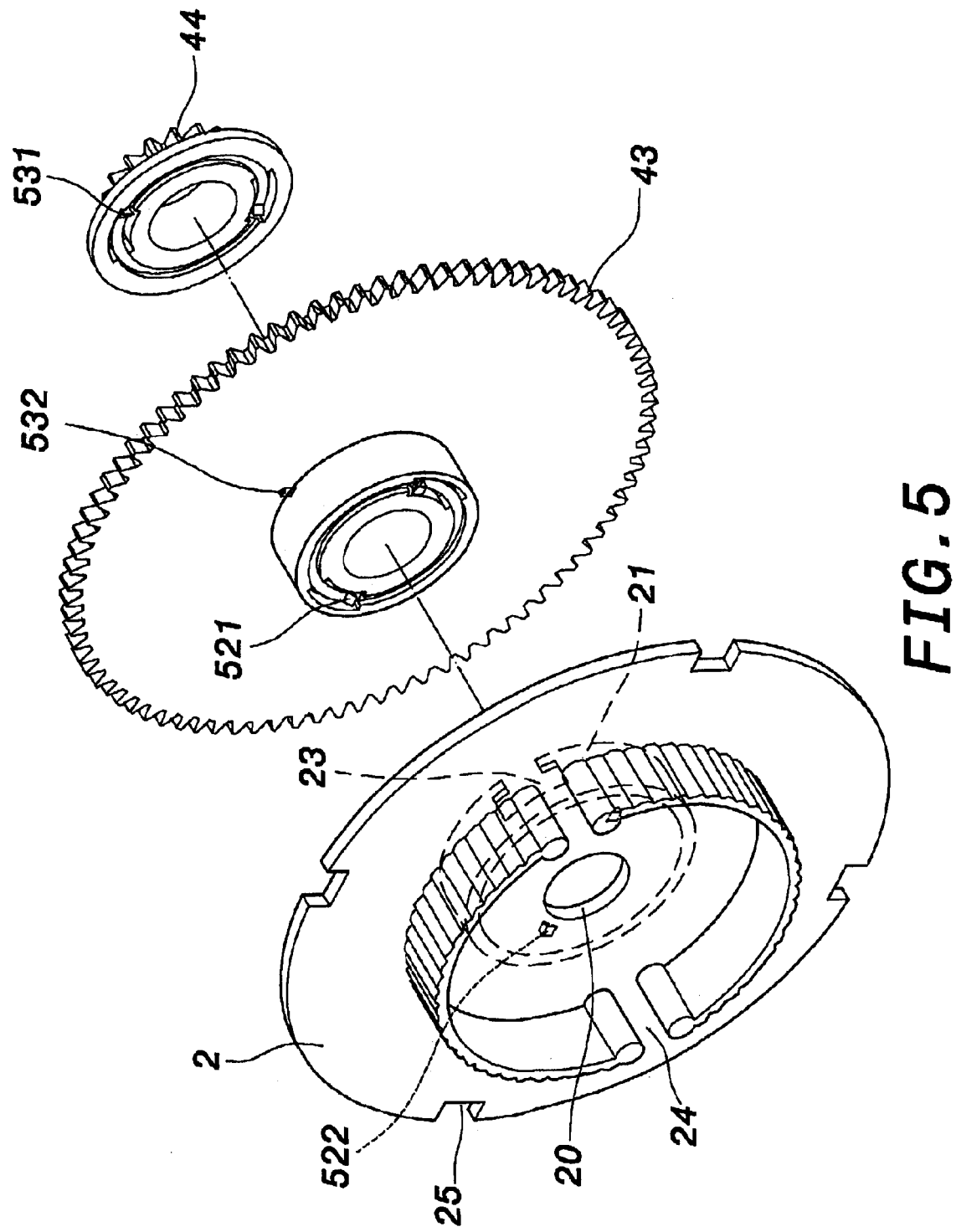
FIG. 5 is an exploded view of part of the invention.

Two ends of the communication wire 3 are connected to various types of connectors, earphones, microphones or other devices of the electronic communication appliances to be applied. As shown in FIG. 2, one end of the communication wire 3 is connected to a hands-free earphone 30, while the other end of the communication wire 3 is connected to a circuit board 7 in the casing 1. The circuit board 7 is then connected by a connecting wire 3 to a plug 32, so two ends of the communication wire 3 can be respectively connected to the hands-free earphone 30 and the plug 32.

Thereby the wire rewinding box is assembled, as shown in FIG. 1. In actual applications, using the characteristics of being able to retrieve a considerable length of communication wire 3 in a convenient way, the user can connect the plug 32 of the communication wire 3 to a socket of related communication appliance to download information. By pulling one end of the communication wire 3 that is connected to the hands-free earphone 30, the communication wire 3 can be pulled directly out of the rewinding box. Meanwhile, due to the action of the coil spring 6, the communication wire 3 maintains a constant pulling tension, so the communication wire 3 can be smoothly rewound into the box, without exposing and tangling up the wire.

Besides, to avoid interference by the rewinding tension when a user tries to pull out the communication wire 3, on the rim of the windlass 2 is a plurality of dents 25. In the vicinity of the windlass 2 is installed a swing plate 26 that can sway freely and a ratchet wheel 27 that can rotate freely. By way of interactions between the ratchet wheel 27, the swing plate 26, the dents 25 on the windlass 2, the communication wire 3 can be pulled out or rewound repeatedly. Since the construction of the above rewinding box is not included in the subject claim, it needs no elaboration here.

The present invention includes a recharge unit 4 installed in the casing of the rewinding box. The recharge unit 4 consists of a gear mechanism 40, a generator 41 and a battery 42. The gear mechanism 40 is installed between the windlass 2 and the generator 41. The force generated when the windlass 2 is rotated is transmitted from the gear mechanism 40 to the generator 41. The gear mechanism 40 consists of a first gear 43, a second gear 44, a third gear 45, a fourth gear 46, a fifth gear 47, a sixth gear 48 and a seventh gear 49. The first gear 43 is installed at one side of the windlass 2. The second gear 44 is installed at one side of the first gear 43. The first gear 43 and the second gear 44 are fitted coaxially on the shaft 13. The third gear 45 and the fourth gear 46 are joined as one unit, and coaxially fitted on a first turning shaft 16 inside the casing 1, so the third gear 45 and the fourth gear 46 can rotate synchronously. The first gear 43 and the third gear 45 are in mesh, so force can be transmitted from the first gear 43 to the third gear 45 and the fourth gear 46.

The fifth gear 47 and the sixth gear 48 are joined as one unit and coaxially fitted on a second turning shaft 17 inside the casing 1. The fourth gear 46 is in mesh with the fifth gear 47, so force is transmitted from the first gear 43, the third gear 45, and the fourth gear 46 to the fifth gear 47 and the sixth gear 48. The generator 41 is fixed inside the casing 1. The seventh gear 49 is joined to a force input shaft 50 of the generator 41. The seventh gear 49 is in mesh with the sixth gear 48, so force is transmitted from the sixth gear 48 to the seventh gear 49, which in turn delivers force to the generator 41, so the generator 41 generates power. The generator 41 is connected by a connecting wire 51 to the battery 42 and the circuit board 7, so the power generated by the generator 41 is transmitted to the circuit board 7 and the plug 32.

Figure 12:
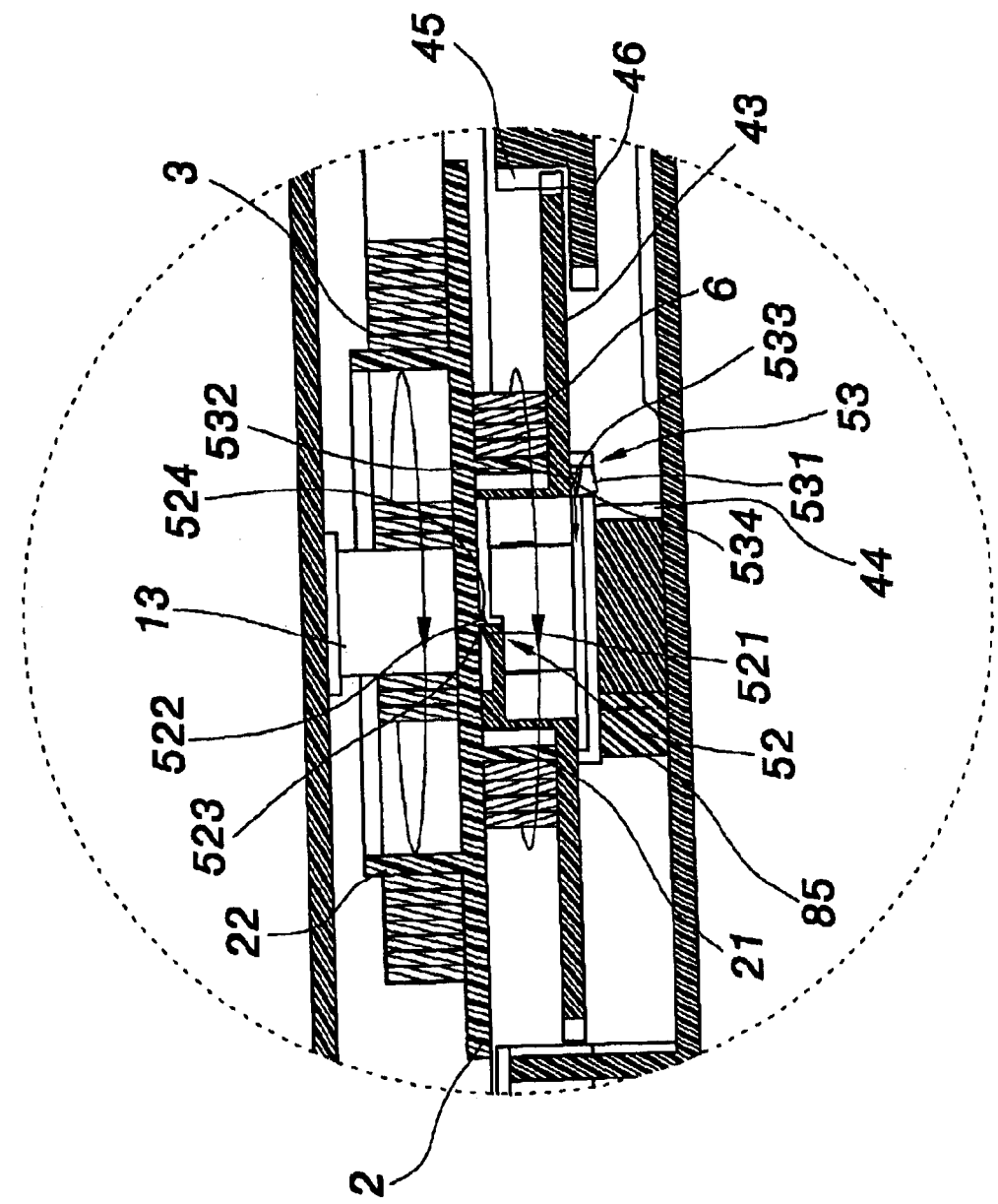
FIG. 12 is a schematic view of the check mechanism of the invention in action (1).

As shown in FIG. 12, the invention has a first check mechanism 52 installed between the windlass 2 and the first gear 43, consisting of a plurality of claw gates 521 on one side of the first gear 43 and a plurality of one-way stop blocks 522 fixed on one side of the windlass 2. The one-way stop block 522 has a push face 523 and an inclined slide face 524. Between the first gear 43 and the second gear 44 is installed a second check mechanism 53, consisting of a plurality of claw gates 531 installed on one side of the second gear 44 and a plurality of one-way stop blocks 532 installed on one side of the first gear 43. The one-way stop block 532 has a push face 533 and an inclined slide face 534.

Figure 8:
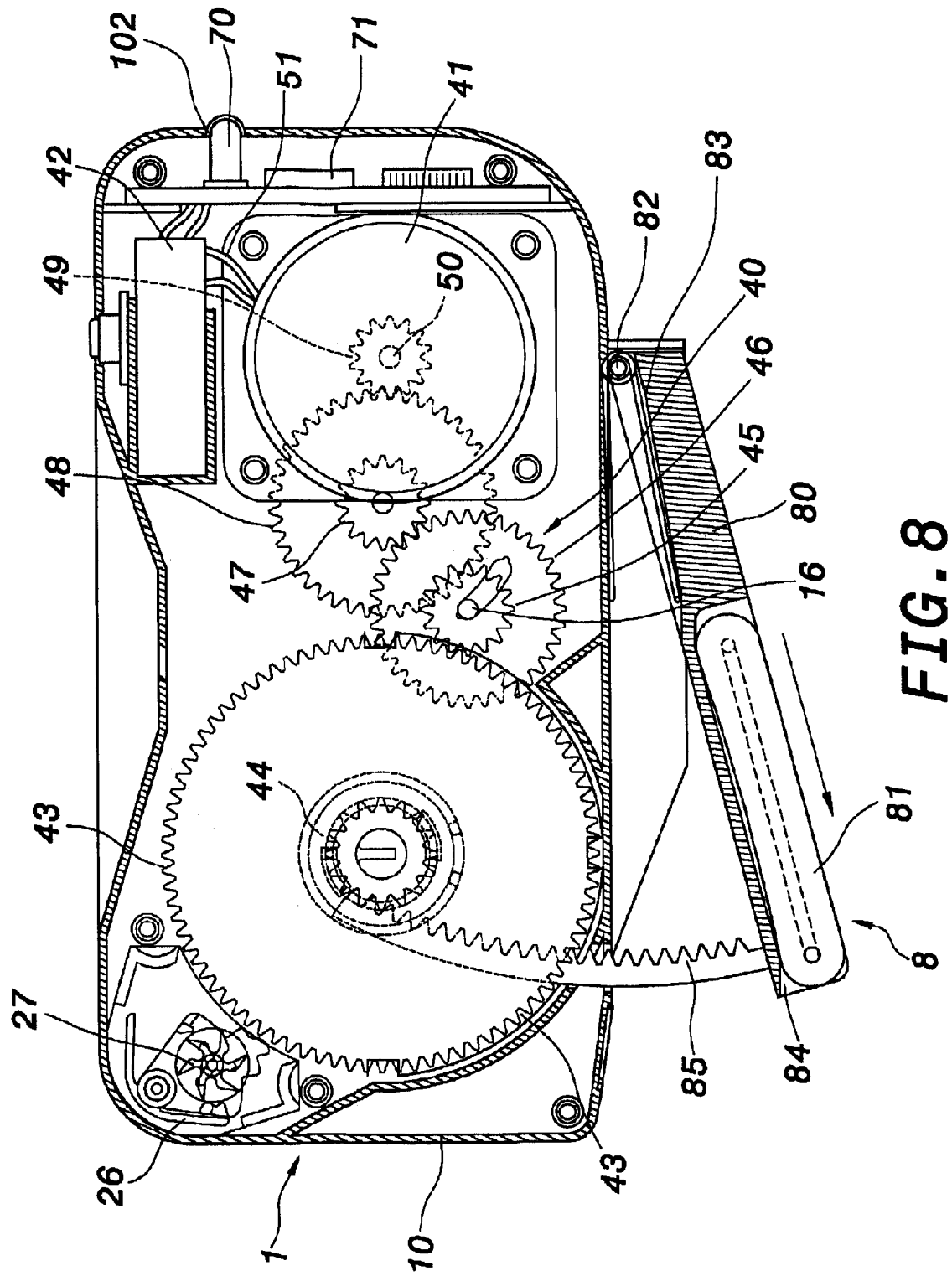
FIG. 8 is a schematic view of the invention in application (3).
Figure 9:
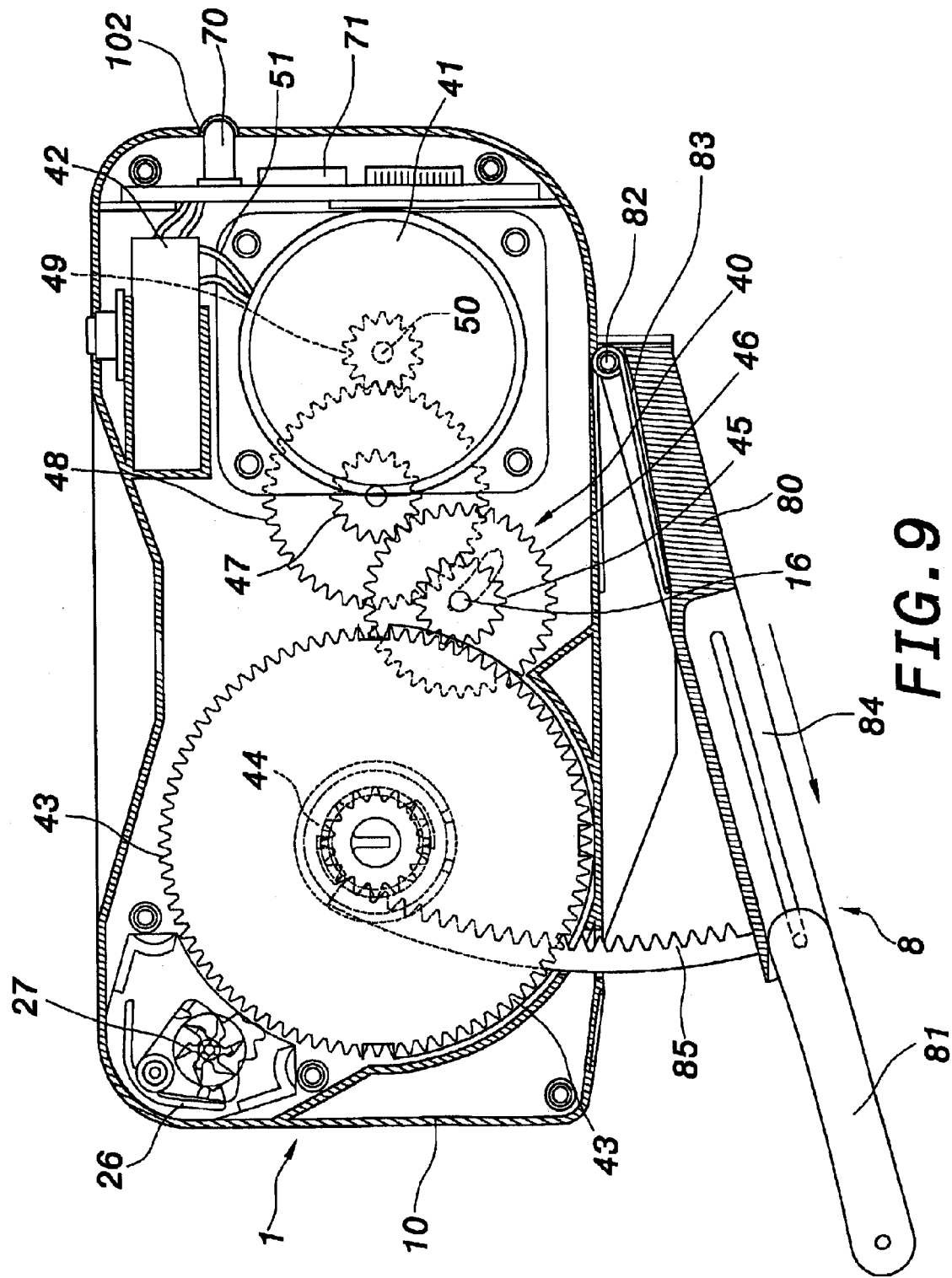
FIG. 9 is a schematic view of the invention in application (4).

The press handle 8 consists of a press handle main unit 80 and a storage unit 81. The press handle main unit 80 has an end that is joined by a shaft 82 to one side of the casing 1. Between the press handle main unit 80 and the casing 1 is an elastic element 83. The elastic element 83 is a torsion spring, pushing a free end of the press handle main unit 80 to extend outwardly. Inside the press handle main unit 80 is an accommodating space 84. The storage unit 81 is movably installed in the accommodating space 84. When not in use, the storage unit 81 is accommodated in the accommodating space 84. To the inside of the press handle main unit 80 is connected an arched rack 85. The rack 85 is in mesh with the second gear 44 (shown in FIG. 8). On the press handle main unit 80 is a positioning groove 86. At one side of the casing 1 is a positioning ring 87. When not in use, the press handle 8 is pressed closely against the casing 1. Then, the press handle 8 is fastened by the positioning ring 87 engaging in the positioning groove 86, saving much space.

Figure 6:
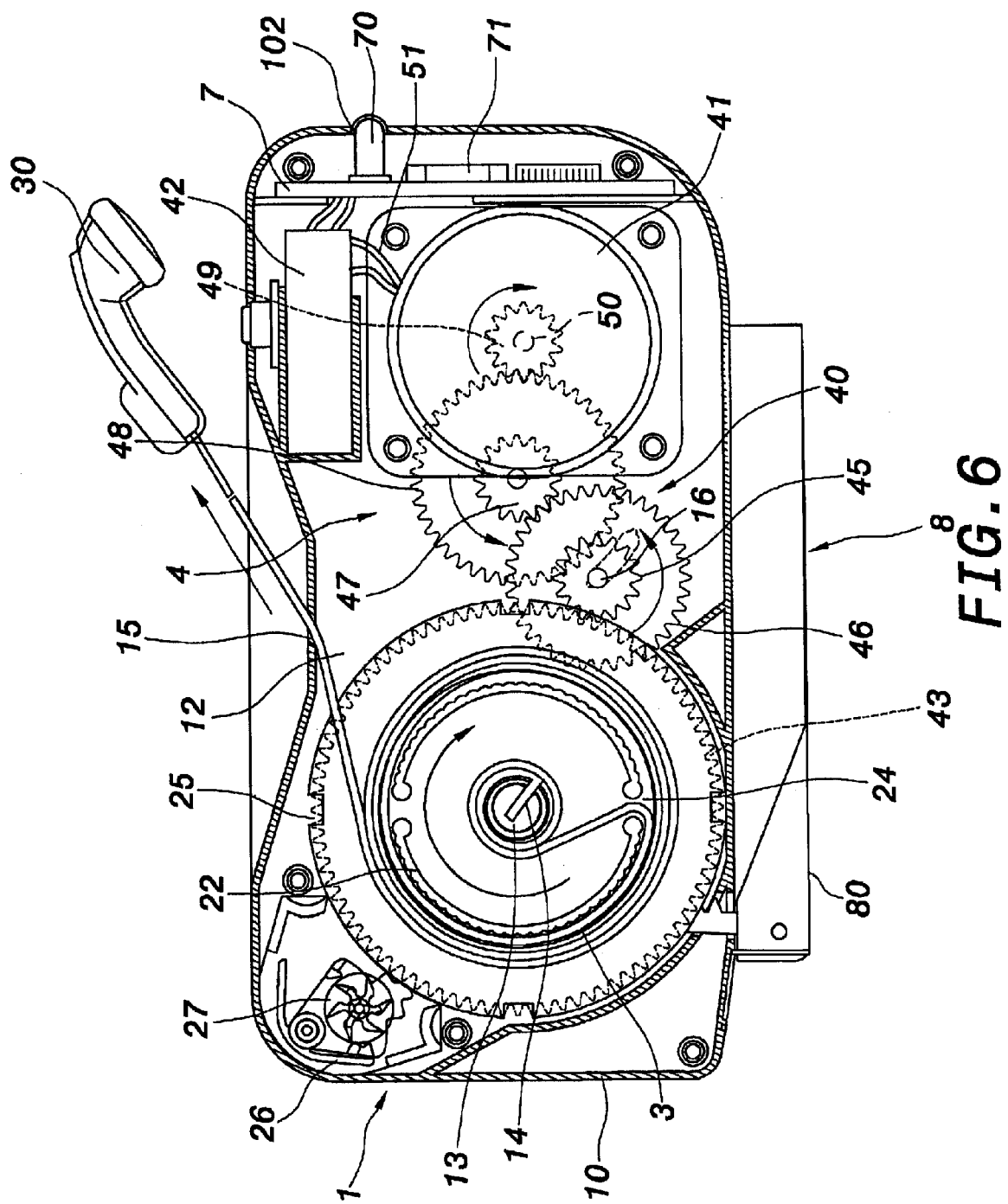
FIG. 6 is a schematic view of the invention in application (1).

As shown in FIGS. 6 and 12, when the communication wire 3 is pulled out of the rewinding box, the windlass 2 drives the first gear 43 of the gear mechanism 40 to rotate, thereby force is transmitted sequentially from the first gear 43, the third gear 45, the fourth gear 46, the fifth gear 47, the sixth gear 48 and the seventh gear 49 to the generator 41, enabling the generator 41 to generate power, and store the power in the battery 42. When the windlass 2 turns in a direction (clockwise), the claw gates 521 of the first gear 53 are pressing against the push face 523 of the one-way stop block 522 of the windlass 2. The windlass 2 then drives the first gear 43 to rotate synchronously, and force is transmitted sequentially from the first gear 43 to the third gear 45, the fourth gear 46, the fifty gear 47, the sixth gear 48 and the seventh gear 49, then to the generator 41. At this stage, the claw gates 531 of the second gear 44 are pressing against the slide face 534 of the one-way stop block 532 of the first gear, so the force of the first gear 43 is not transmitted to the second gear 44, and the second gear 44 can be driven only by the press handle 8.

Figure 7:
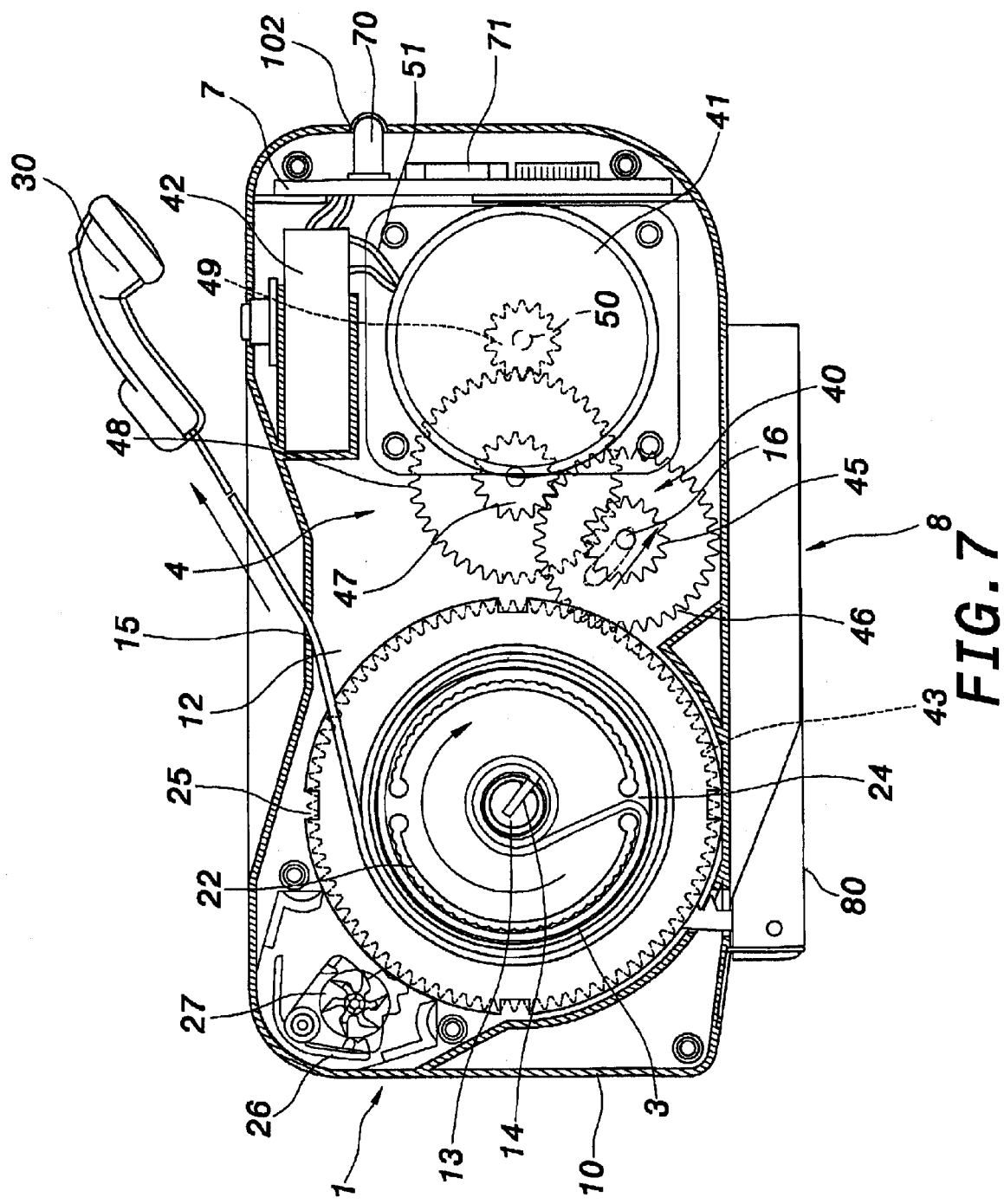
FIG. 7 is a schematic view of the invention in application (2).

As shown in FIGS. 2 and 7, the third gear 45 and the fourth gear 46 are designed to move. Two ends of the first turning shaft 16 are located in a chute 18 on the casing 1. Two ends of the first turning shaft 16 can move inside the chute 18, to drive the third gear 45 and the fourth gear 46 to move, so the third gear 45 is optionally meshed with the first gear 43, and force is transmitted sequentially from the first gear 43, the third gear 45, the fourth gear 46, the fifth gear 47, the sixth gear 48 and the seventh gear 49 to the generator 41. The third gear 45 can be optionally disengaged from the first gear 43, so that force is not transmitted to the generator 41 for recharging function, but only the function of the rewinding box.

Figure 13:
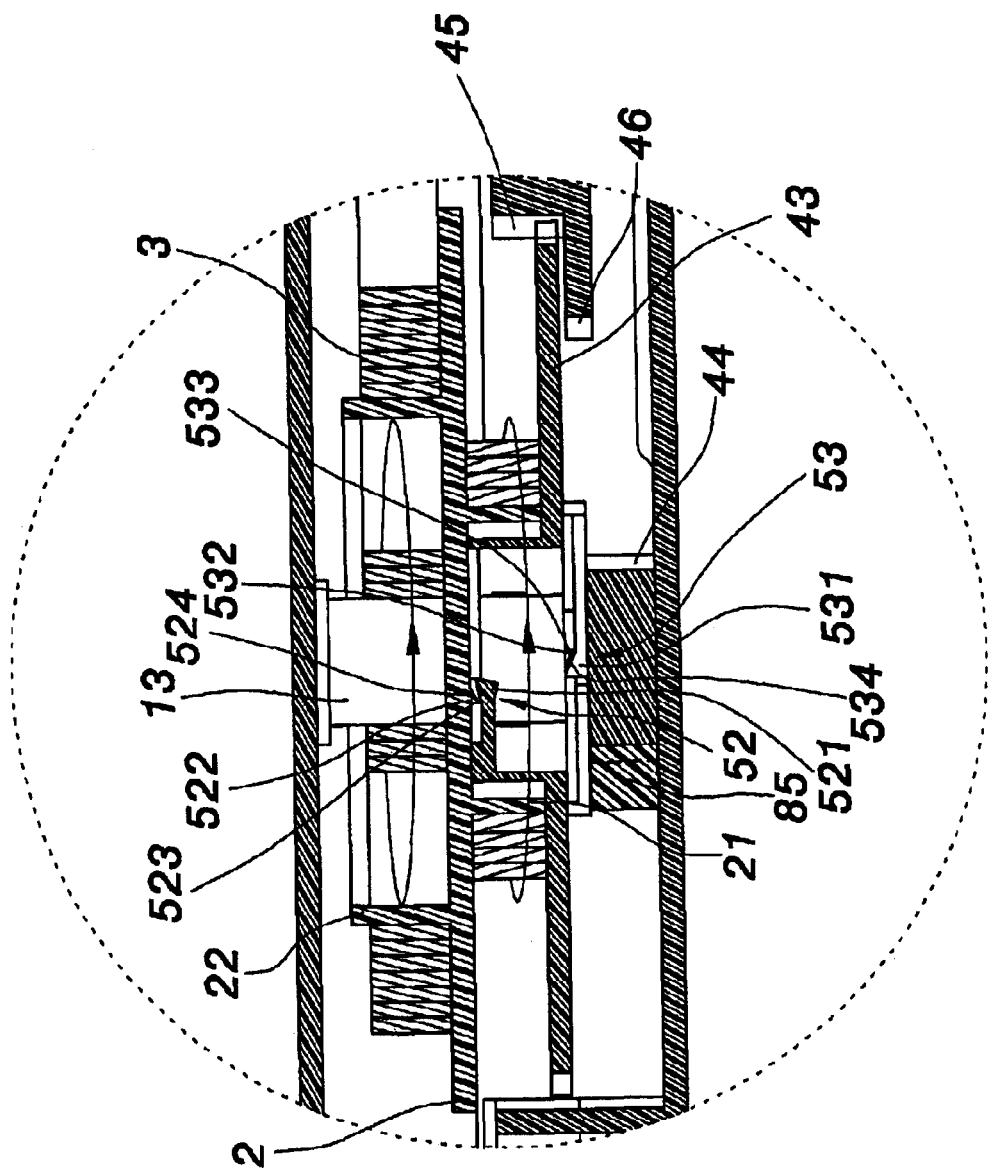
FIG. 13 is a schematic view of the check mechanism of the invention in action (2).

As shown in FIG. 13, when the communication wire 3 is subjected to the action of the coil spring 6 inside the box and maintain a constant pulling tension, to rewind the communication wire 3 into the box. In this condition, the coil spring 6 pushes the windlass 2 to turn in the other direction (anticlockwise), the claw gates 521 of the first gear 43 can press against the slide face 524 of the one-way stop block 522 of the windlass 2, so force is transmitted only from in one direction from the windlass 2 to the first gear 43. When the windlass 2 is turning in reverse direction, transmission of force is interrupted, and force is not transmitted to the first gear, to avoid reverse rotation of the generator 41.

Figure 10:
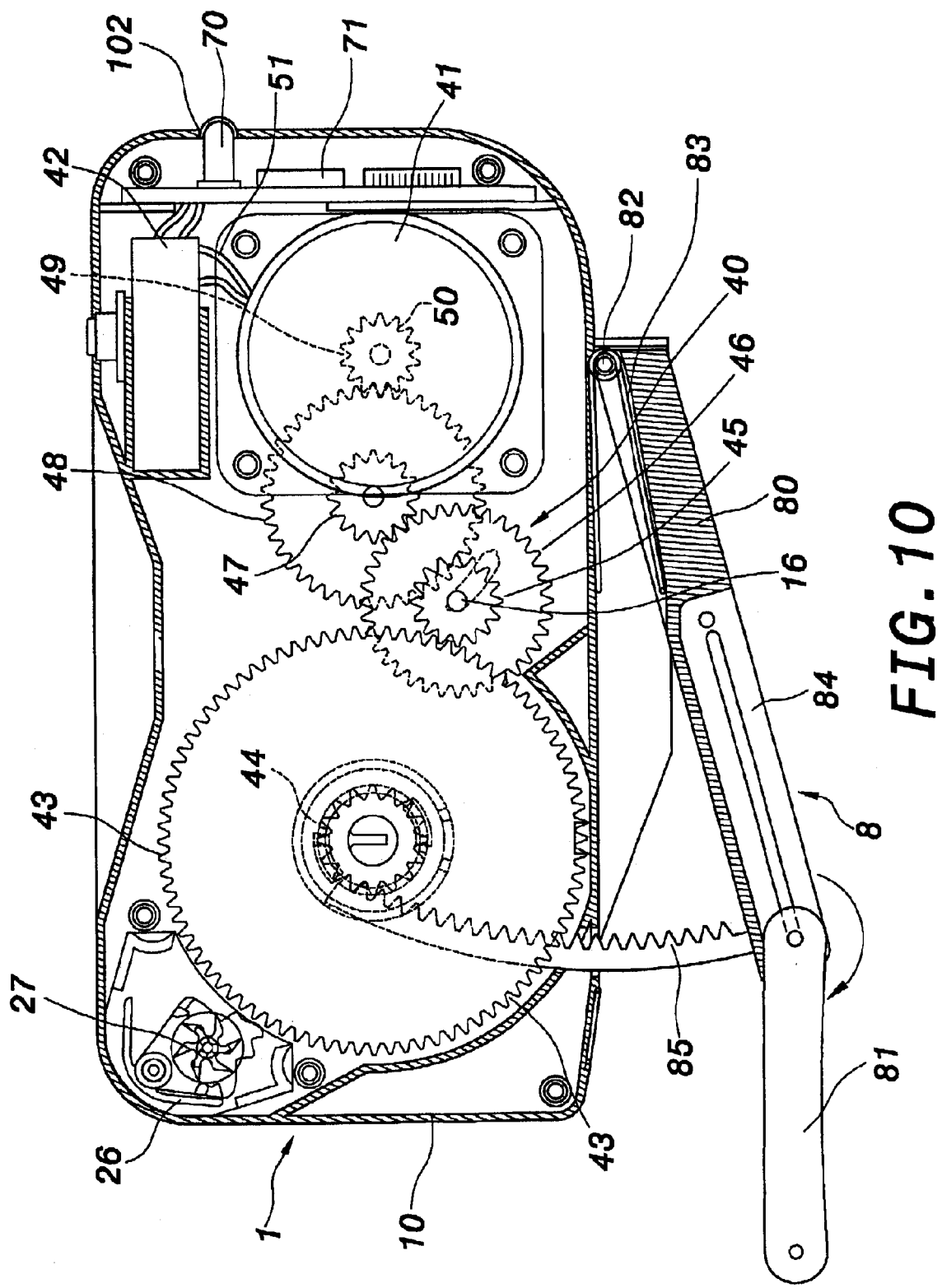
FIG. 10 is a schematic view of the invention in application (5).

As shown in FIGS. 8 through 11, the invention also involves a press handle 8 that can be pressed to transmit force from the gear mechanism 40 to the generator 41. First, the press handle main unit 80 is extended (FIG. 8) using the shaft 82 as a fulcrum, moving the storage unit 81 outwardly, so the storage unit 81 is outwardly extended, forming an elongated length (FIG. 9) of the press handle main unit 80 and the storage unit 81. Thereby, the press handle unit and the storage unit 81 can be pressed inwardly (FIG. 10). When the free ends of the press handle main unit 80 and the storage unit 81 are pressed to move inwardly, the rack 85 can push the second gear 44 to rotate (FIG. 11), causing the second gear 44 to drive the first gear 43 to rotate synchronously. Then, power is transmitted sequentially from the first gear 43, the third gear 45, the fourth gear 46, the fifth gear 47, the sixth gear 48 and the seventh gear 49 to the generator 41.

Figure 11:
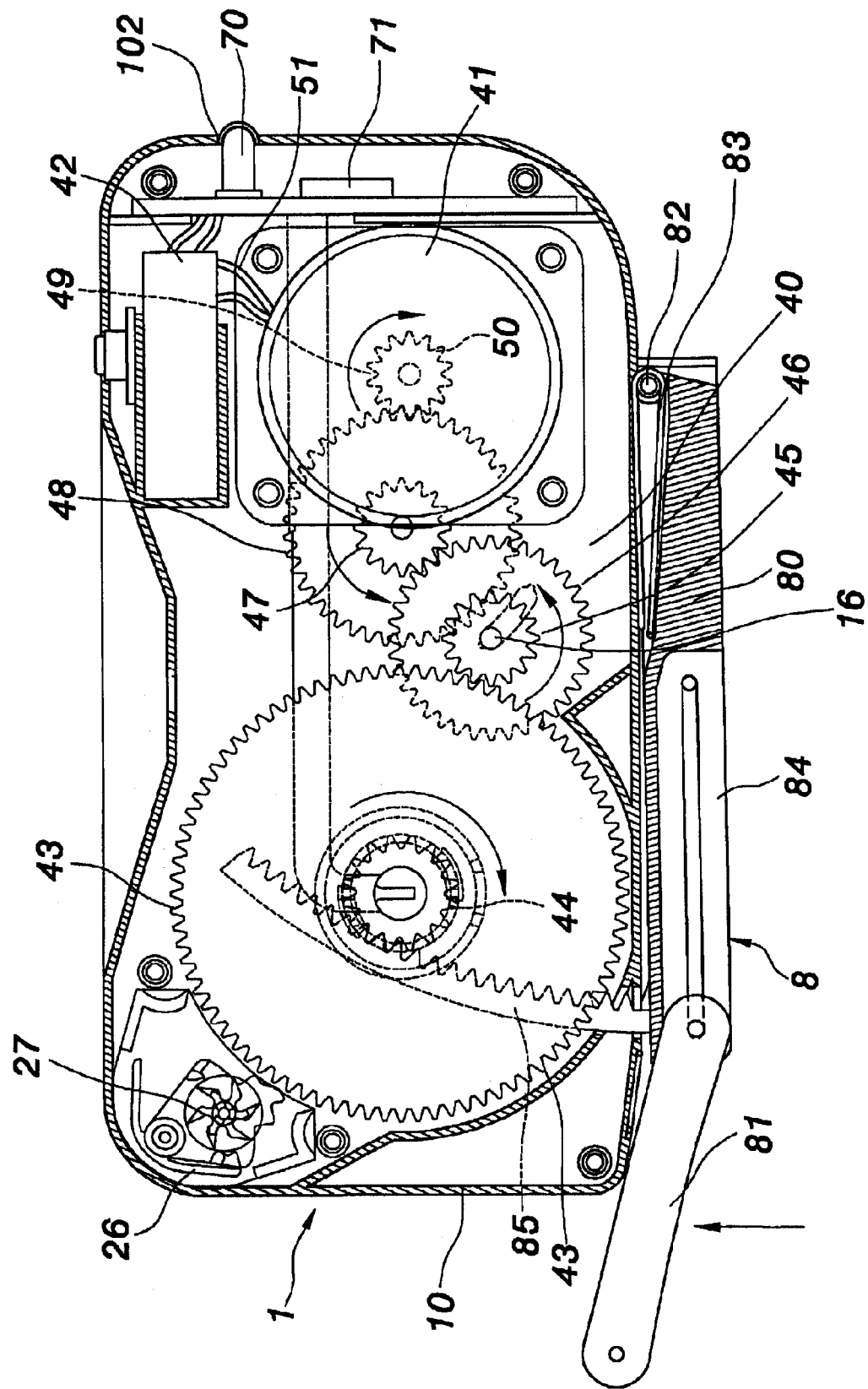
FIG. 11 is a schematic view of the invention in application (6).
Figure 14:
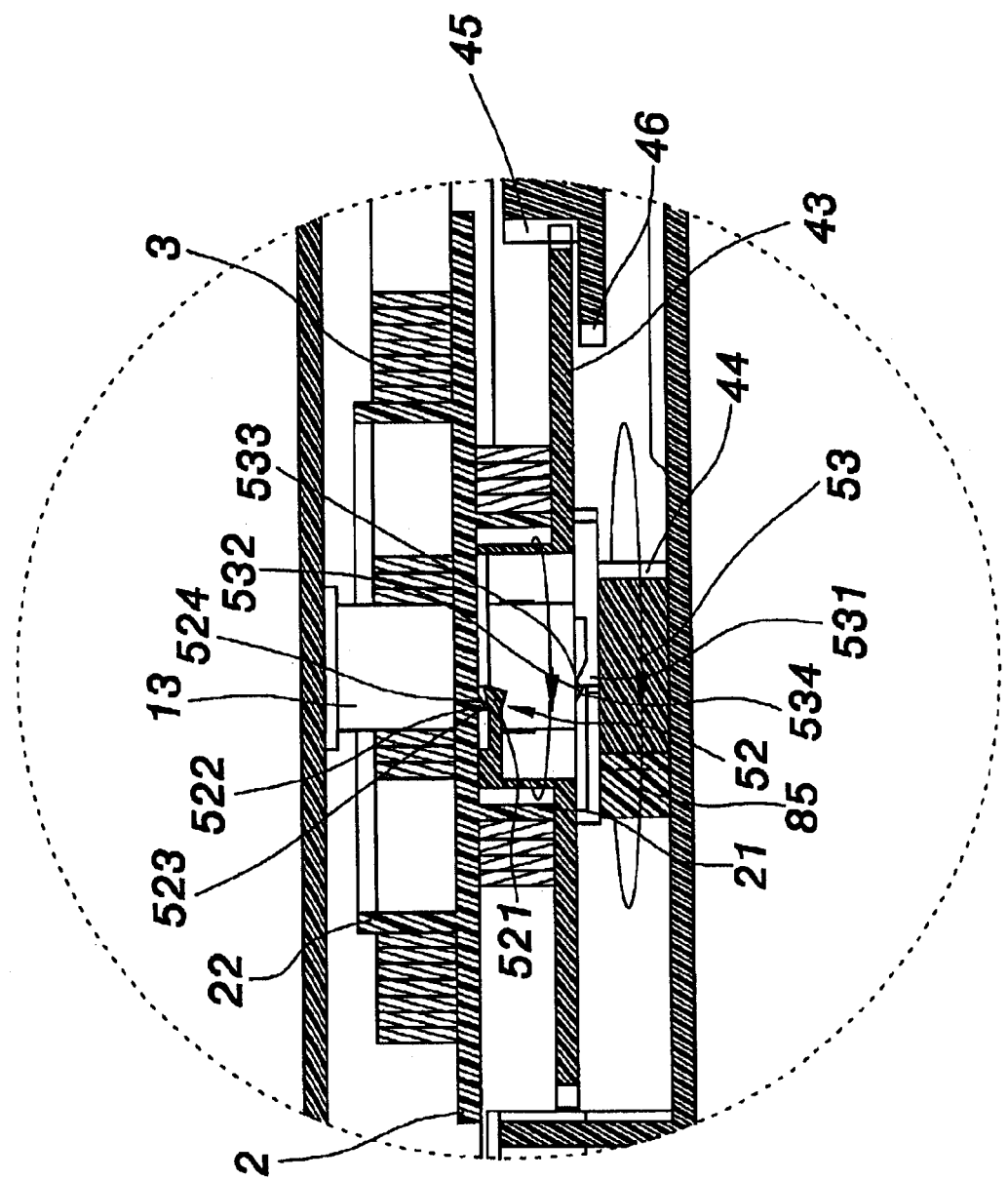
FIG. 14 is a schematic view of the check mechanism of the invention in action (3).

As shown in FIGS. 11 and 14, when the press handle 8 is pressed and the rack 85 pushes the second gear 44 to rotate in a direction (clockwise), the claw gates 531 of the second gear 44 are pressing against the push face 533 of the one-way stop block 532 of the first gear 43, so the second gear 44 pushes the first gear 43 to rotate synchronously. Thereby, power is transmitted from the second gear 44 in one direction to the fist gear 43. But when the second gear 44 rotates in a reverse direction, force transmission is interrupted. In other words, power is not transmitted to the first gear 43, to avoid reverse rotation of the generator 41.

In addition to the basic function of rewinding the communication wire 3, the invention enables the user to generate power in the recharge unit 4 when the user is puling the communication wire 3, thereby providing additional functions such as power generation and recharging. The plug 32 can be connected to a mobile phone handset or such communication appliances for recharging purpose to provide a power source. Moreover, by pressing on the press handle 8, the recharge unit 4 will generate power, so the invention can have more resourceful power, instead of relying completely on pulling the communication wire 3 to generate power.

Furthermore, since the rewinding box serves the functions of power generation, recharging and providing power source, the circuit board 7 can be installed inside. The circuit board 7 can be designed to suit varied circuits, so that power generated by the generator 41 can be converted to different voltages or currents. On the circuit board 7 can be installed a light-emitting element 70, such as a light-emitting diode or lamp, for lighting purpose. Optionally, the circuit board 7 is installed with a sounding element 7, such as a buzzer or a speaker, providing alarm or radio functions. Correspondingly on the casing 1 are a light-permeating hole 102, a sound hole 103, a light-emitting element 70, and a sounding element 71, enabling versatile application to the present invention of rewinding box.

Figure 15:
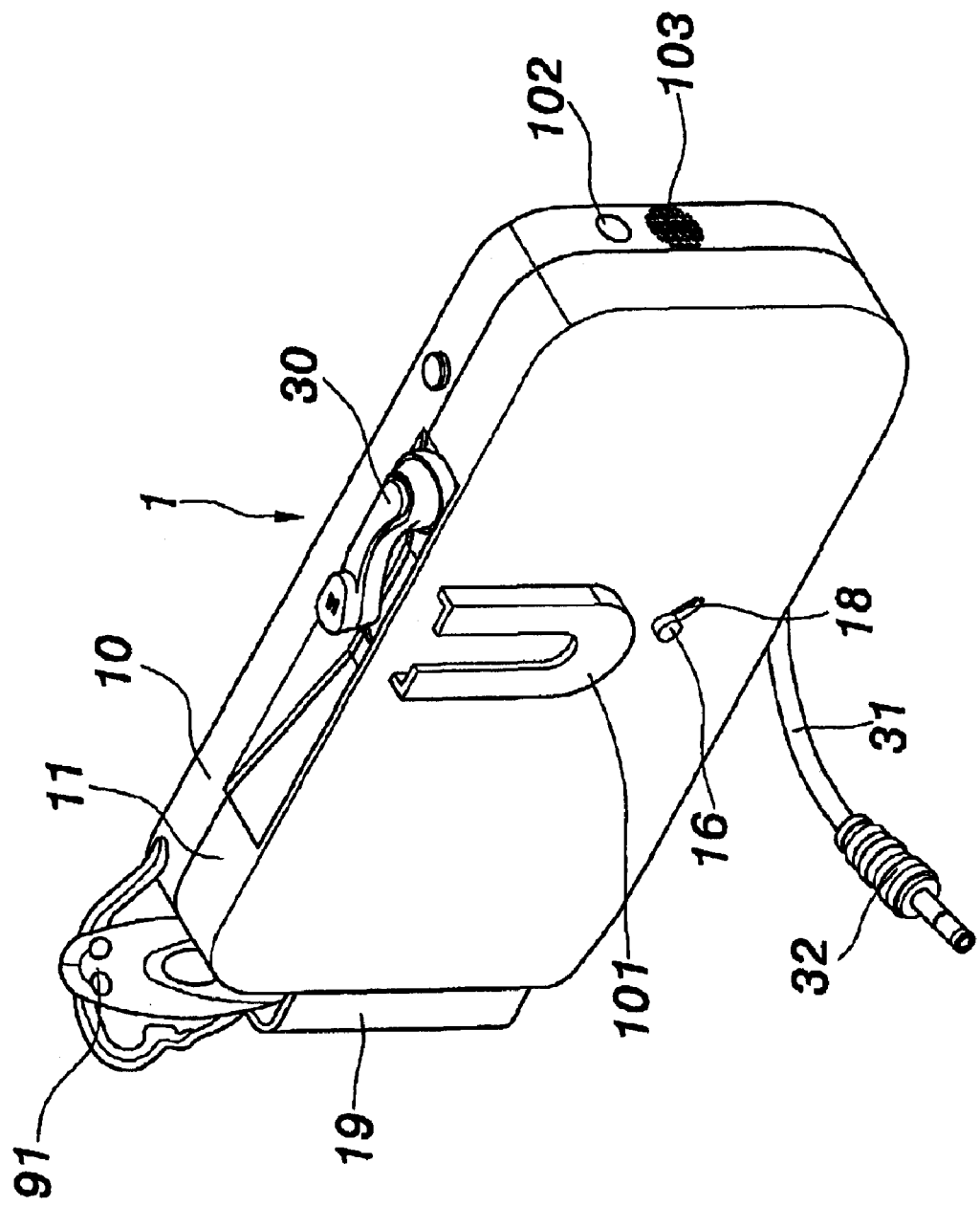
FIG. 15 is a perspective view of another embodiment of the invention.
Figure 16:
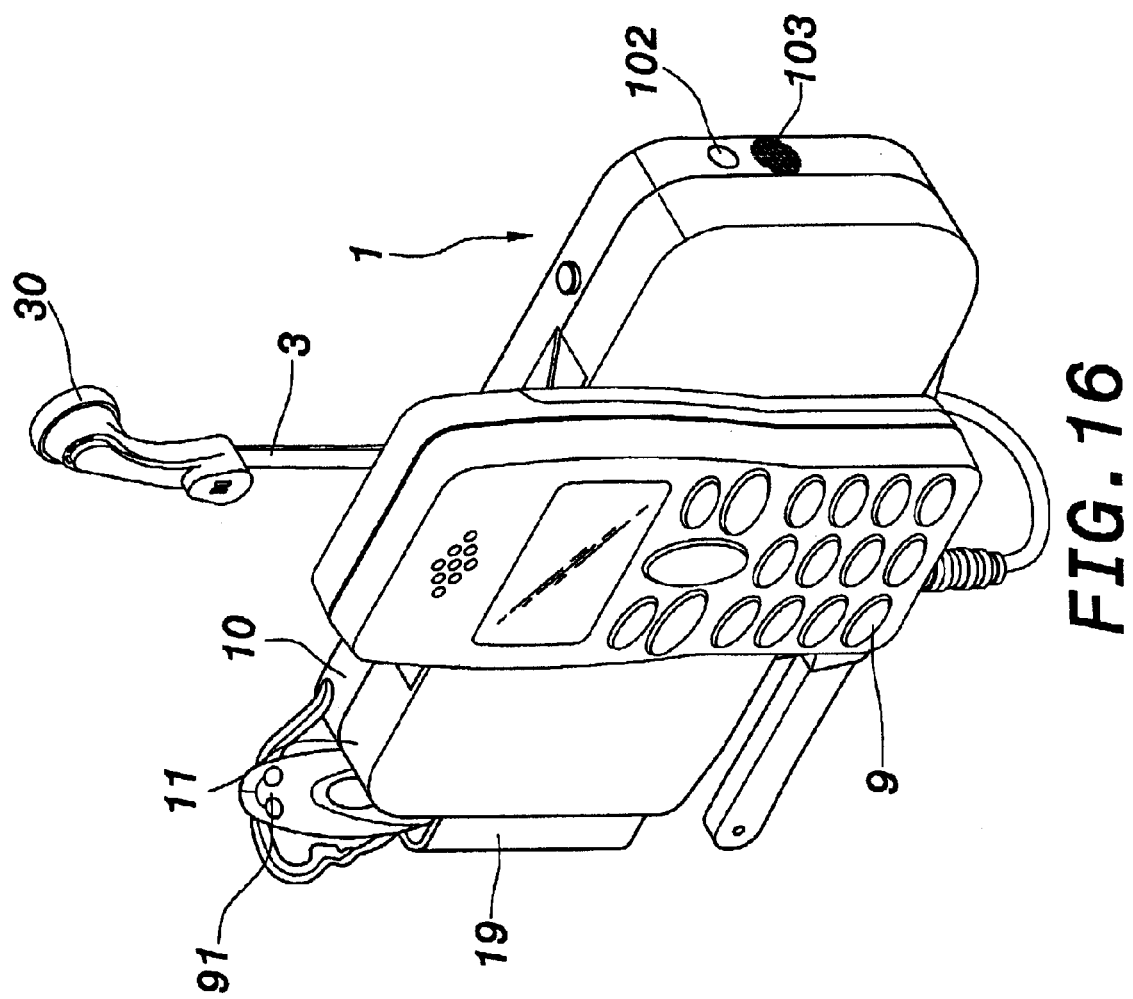
FIG. 16 is a view of another embodiment of the invention in application.

As an option shown in FIGS. 15 and 16, on the outside of the casing is a placement groove 19. The placement groove 19 serves to accommodate the placement of an earphone 91 or the like. On the outside of the casing 1 is optionally a snap fastener 101. The snap fastener 101 serves to fasten a fastening unit (not shown in drawing) on the back of a mobile phone 9.

To conclude, the invention of rewinding box disclosed herein has multiple functions, such as power generating, recharging and providing a power source. With a wide range of applications, practical advancement in its functions, industrial applicability and inventive step, the disclosure being not yet seen or used in similar products, in public, nor in publications, the invention has satisfied the requirements for a patent right. Acwireing to the patent law, this application is duly filed. Your favorable consideration will be appreciated.

It should be understood herewith that, the above description covering merely some preferred embodiments of the invention, shall not be based to restrict or limit the subject claim, and that all equivalent variations or modifications made without departing from the contents of above description and drawings, shall be included in the spirit and intent of the subject claim.

What is claimed is:

1. A wire rewinding box with a recharge unit, comprising:
   a hollow casing defining a receiving chamber therein, a positioning ring being mounted on a lower end of said hollow casing;
   a windlass received within said receiving chamber;
   a coil spring biasing said windlass with respect to said hollow casing;
   a circuitboard having a light emitting element and a sound producing element, said circuitboard being received within said receiving chamber;
   a first communication wire being wound on said windlass, a first end of the first communication wire projecting through the casing, a second end of said first communication wire being in electrical communication with said circuitboard;
   a second communication wire having a first end projecting through said hollow casing and a second end being in electrical communication with said circuitboard;
   a recharge unit having a gear mechanism, a generator and a battery, said recharge unit being received within said receiving chamber, said gear mechanism being positioned between the windlass and the generator, said battery being in electrical communication with said generator, said first communication wire driving said gear mechanism for recharging said battery; and a gear received within said receiving chamber and being mounted at one side of said windlass to connect with said gear mechanism;

a telescoping press handle having a positioning groove formed therein, said positioning ring being received within said positioning groove, said telescoping press handle being mounted on said lower end of said hollow casing, said telescoping press handle communicating with said gear mechanism for recharging said battery, said telescoping press handle being telescopically reversibly extendable.

2. The wire rewinding box with a recharge unit as claimed in claim 1, wherein said hollow casing includes a first half casing and a second half casing that are combined as one unit, a shaft being received within said receiving chamber, the shaft having a wire groove and said hollow casing having a wire outlet on a side thereof, said windlass having a shaft hole that is inserted by the shaft for the purpose of rotation, a first winding rim and a second winding rim being formed on opposed sides of said windlass, the first winding rim having a hook groove onto which a hook end of the coil spring is hooked, one end of the communication wire being pulled through the wire groove of the shaft and being wound on the shaft and the second winding rim, and further projecting out of the wire outlet of the hollow casing.

3. The wire rewinding box with a recharge unit as claimed in claim 1, wherein the hollow casing has a placement groove and a snap fastener formed on an outer surface thereof.

4. The wire rewinding box with a recharge unit as claimed in claim 1, wherein the press handle includes a press handle main unit and a storage unit, one end of the press handle main unit being joined to one side of the hollow casing, an elastic element being mounted between the press handle main unit and the hollow casing, an accommodating space being formed inside the press handle main unit, the storage unit being received in the accommodating space, an arched rack being mounted inside the press handle main unit, the arched rack being meshed with the gear mechanism.

5. The wire rewinding box with a recharge unit as claimed in claim 1, wherein the gear mechanism includes a plurality of gears, there being a first check mechanism between the windlass and the first gear, and a second check mechanism between the first gear and the second gear.

6. The wire rewinding box with a recharge unit as claimed in claim 5, wherein the first check mechanism consists of a plurality of claw gates on the first gear and a plurality of one-way stop blocks that are fixed on the windlass, the one-way stop block having a push face and an inclined slide face, the second check mechanism consists of a plurality of claw gates on the second gear and a plurality of one-way stop blocks on the first gear, said one-way stop block having a push face and an inclined slide face.

7. The wire rewinding box with a recharge unit as claimed in claim 1, wherein a specified number of gears in the gear mechanism are designed to be mobile, with two ends of a turning shaft of the gear fitted in a chute on the casing, the turning shaft being capable of sliding inside the chute, so the gear is optionally meshed with or disengaged from another gear.

* * * * *